Dec. 7, 1971      P. A. COUTELAN      3,624,920

HEAT EXCHANGE GRATE AND SUPPORT FRAME ASSEMBLY

Filed Jan. 7, 1970      4 Sheets-Sheet 1

INVENTOR
PIERRE A. COUTELAN

BY
Pennie, Edmonds, Morton, Taylor & Adams
ATTORNEYS

INVENTOR
PIERRE A. COUTELAN

FIG. 12.
FIG. 13.
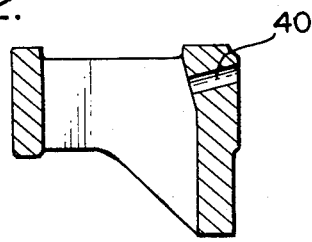
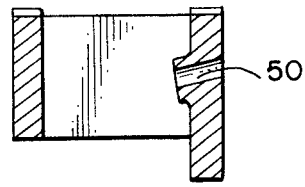
FIG. 14.
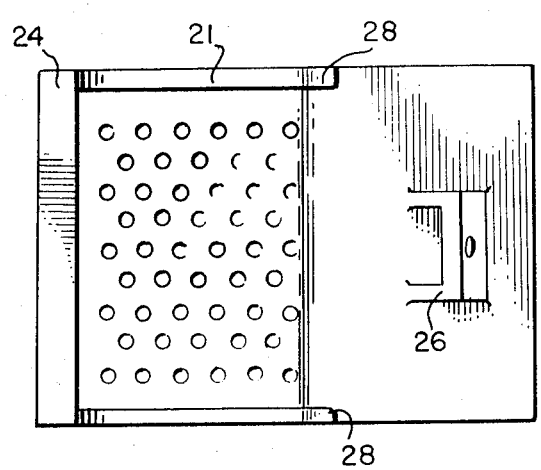
FIG. 15.
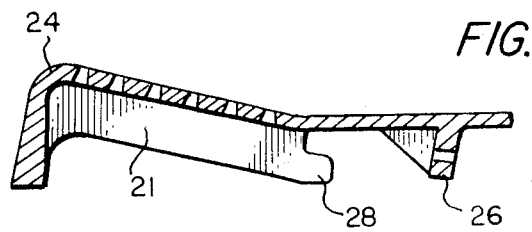
FIG. 16.
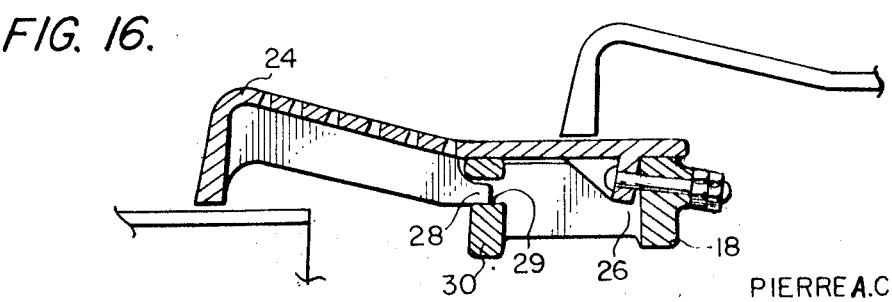

United States Patent Office 3,624,920
Patented Dec. 7, 1971

3,624,920
HEAT EXCHANGE GRATE AND SUPPORT FRAME ASSEMBLY
Pierre A. Coutelan, Eaubonne, France, assignor to Fuller Company, Catasauqua, Pa.
Filed Jan. 7, 1970, Ser. No. 1,201
Int. Cl. F26b 9/00
U.S. Cl. 34—164                                      6 Claims

ABSTRACT OF THE DISCLOSURE

This invention relates to an improved heat exchange apparatus of the reciprocating grate type having a grate and support frame assembly wherein no portion of the support frame contacts the grate at a point forward of about substantially the midportion of the grate and the grate has at least one reinforcing flange depending therefrom, said flange having a downwardly-protruding extension with engaging means adapted to engage the support frame.

BACKGROUND OF THE INVENTION

Heretofore, heat exchange apparatus utilizing grate plates have been difficult to maintain and not completely satisfactory as to heat transfer efficiency. This is particularly true with respect to heat exchange apparatus of the reciprocating grate type such as used for the cooling of portland cement clinker as set forth in U.S. Pat. No. 2,431,799.

Such apparatus comprises a series of alternate fixed and movable grates mounted on support frames. The fixed supports are part of a common frame fixedly secured to the frame of the apparatus while the movable grate supports are mounted on a common movable frame mounted on suitable means to be driven in a reciprocating manner by a power source. The grates are arranged in an overlapping fashion and so positioned that the movable grates reciprocate with respect to the fixed grates. The grates can be arranged in a horizontal or slightly inclined position and are provided with perforations. The grates are attached to their respective frames, as by bolts, and supported in their forwardmost portions by horizontal arms, or holding fingers as they are sometimes referred to, which extend outwardly from the transverse support bars of the support frame to the leading edges of the grates.

In operation, the hot product to be cooled passes over the grates and through the apparatus due to the action of the reciprocating grates and is cooled during such passage by the cooling air passing into the product through the perforations in the grates.

In such heat exchanger, the movable grates push the hot product by their forward movement over the surface of and onto the front end of the fixed grates. Some of the product thus falls on the next movable grate, and when the movable grates return to the rear the fixed grates situated above them serve as pushers on the movable grates. The hot product gradually advances, undergoing the cooling action exerted by the cooling air passing through the grates.

Contact between the hot product and the grates and support frames has the effect of raising the temperature of the supports and particularly of the grates, which causes wear on these elements and they have to be replaced periodically. This wear is aggravated as to the grates by thermal shocks due to the hot material on the upper surface thereof and cooling air beneath, as well as by the abrasiveness of the products being cooled by this heat exchange apparatus.

In addition, cooling efficiency is hampered by the holding fingers of the support frame which act as a heat sink and act to block a portion of the cooling air from passing into the hot product. Also importantly the holding fingers prevent removal of the grates for replacement when worn except through the upper hot chamber containing the hot product. The result is that the apparatus must be shut down for a considerable period of time in order to permit the product chamber to cool sufficiently, thereby permitting safe access for replacement of worn or broken grates.

SUMMARY OF THE INVENTION

The present invention relates primarily to a heat exchange grate, horizontal or on a slightly inclined slope, which remedies the drawbacks of the previous art by improving thermal efficiency, eliminating part of the support frame, and simplifying maintenance by making replacement of the grates rapid and convenient.

Other objects of the invention are to furnish a better distribution of the perforations through which the cooling air passes in the grates, as well as a better attachment of the grates to their support, and support frames of simpler design, facilitating passage of cooling air and permitting replacement of the grates solely by intervention below the grate assembly, that is to say in the compartment from whence cooling air is blown, which is more readily accessible.

By replacing grates solely through the cooling air compartments, it is less dangerous to replace the grates on an apparatus when functioning, and the down time for replacement is markedly reduced.

Briefly stated, the present invention comprises an improved heat exchange apparatus, of the type described, having a grate and support frame assembly wherein no portion of the support frame contacts the grate at a point forward of about substantially the midportion of the grate and the grate has at least one reinforcing flange depending therefrom, said flange having a downwardly-protruding extension with engaging means adapted to engage the support frame.

BRIEF DESCRIPTION OF THE DRAWINGS

Other and further objects and advantages of the invention will be apparent from the following description and claims, and are illustrated by the accompanying drawings which, by way of illustration only, show preferred embodiments of the invention.

In the drawings:

FIGS. 6 and 14 are partial bottom views of alternate embodiments of grates of the instant invention;

FIGS. 12 and 13 are sectional views taken along lines 12—12 and 13—13, respectively, of FIGS. 10 and 11, showing locations for fastening the grates to the support;

FIG. 15 is a sectional view of an alternate embodiment of grate of the instant invention; and FIG. 16 is a sectional view of the grate of FIG. 15 in interlocking engagement with a support frame.

DETAILED DESCRIPTION

Figure 1:
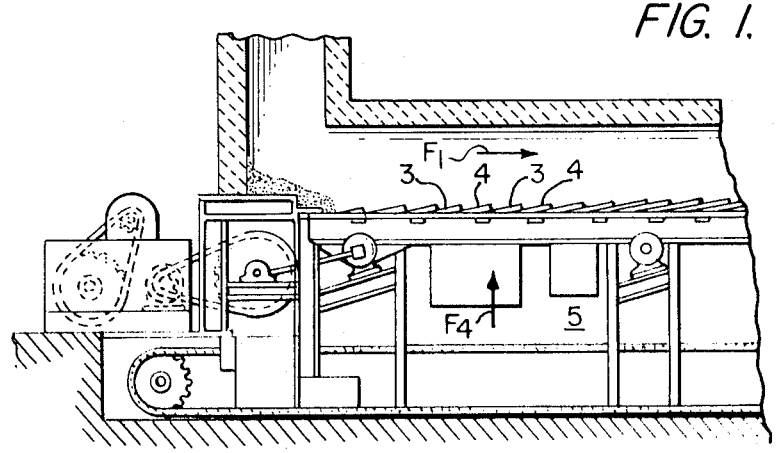
FIG. 1 is a view in partial vertical section of one end of a conventional heat exchange apparatus that does not form part of the instant invention.

Referring to the drawings, FIG. 1 illustrates a conventional exchanger 10 in which a hot product 1 is carried from entry 2 to the outlet (not shown) in the direction of arrow $f_1$, over a system of movable grates 3 and fixed grates 4. The cooling air flows from air compartment 5 through the grates 3 and 4.

Figure 2:
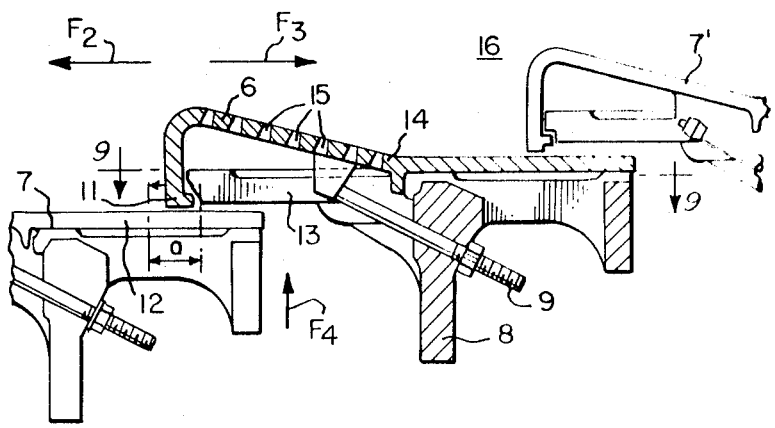
FIG. 2 is an enlarged sectional view of a group of grates of the exchange apparatus of FIG. 1.
Figure 9:
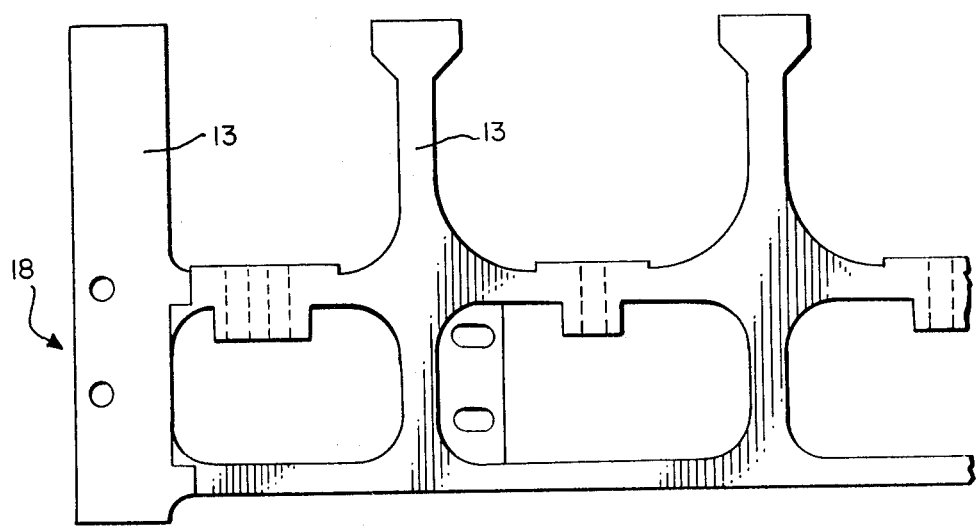
FIG. 9 is a plan view taken along lines 9—9 of FIG. 2 showing the support frame of the previous art.
Figure 10:
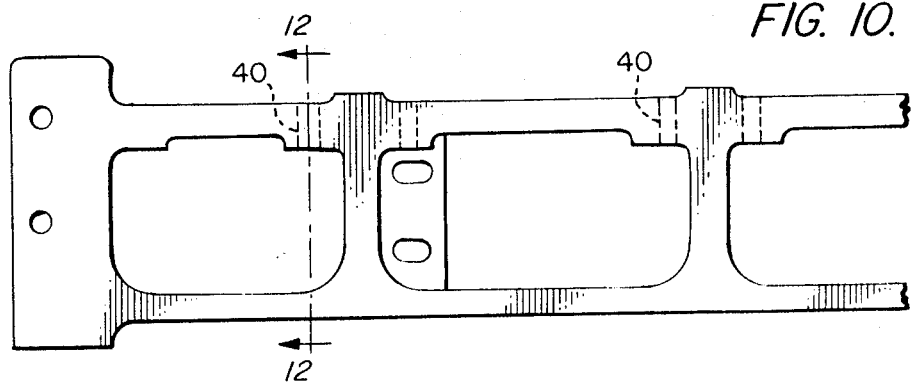
FIGS. 10 and 11 are plan views taken along lines 10—10 and 11—11, respectively, of FIGS. 3 and 8, showing the support according to the instant invention.

A conventional grate of the prior art 6, movable on a forward stroke for a distance $a$, alternately, for example in the direction of arrows $f_2$ and $f_3$ relative to adjacent fixed grates 7 and 7', is shown in FIG. 2. This grate and support frame are shown in FIGS. 2 and 9 wherein the 6 is connected to a support 8 by means of a bolt 9. The horizontal part or sloping part of grate 6 terminates in a leading edge 11 overlapping the horizontal part 12 of an adjacent similar grate 7 of the product bed feed system from which the heat is to be removed.

An arm or holding finger 13 acts to support the grate and is connected to the support frame 8. The grate is connected to the support frame 8 by a rib 14 with central contact.

The grate has perforation 15 to permit the air, flowing in the direction of arrow $f_4$, to pass through the grate in order to exchange heat with the materials of the bed.

Wear on the grates 6, owing to their intimate contact with the product at high temperature, for example, such as hot slag or clinker, necessitates their frequent replacement. It is seen that their removal after dismounting is only possible through the upper chamber 16 of the exchanger 10, which entails certain complications. Furthermore, the arm 13 of support 8, which contributes to the mechanical strength of the grate support assemblies, intercepts a portion of the cooling air current $f_4$, which reduces the efficiency of the installation.

Figure 3:
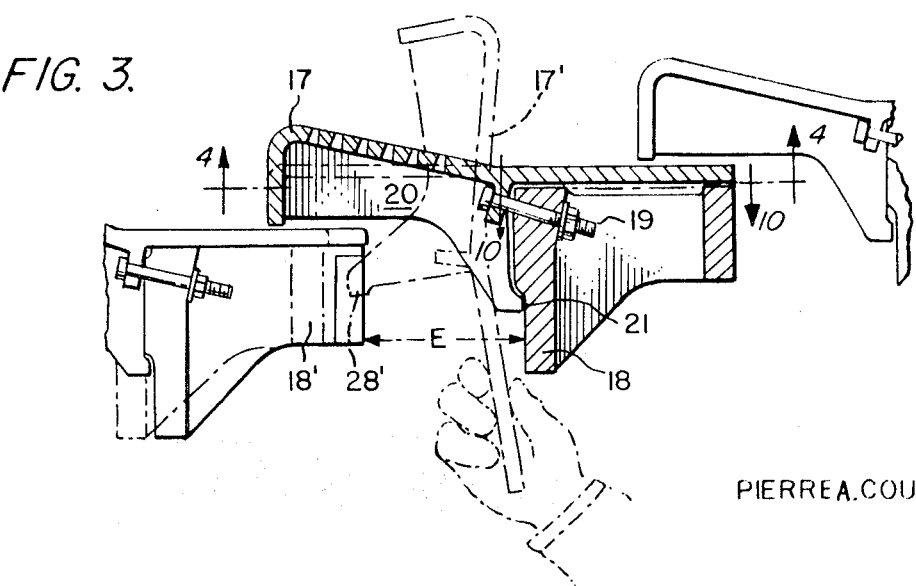
FIG. 3 is a sectional view of an assembly according to the invention showing, in dotted lines, the method of replacement of the grates through the supports.
Figure 4:
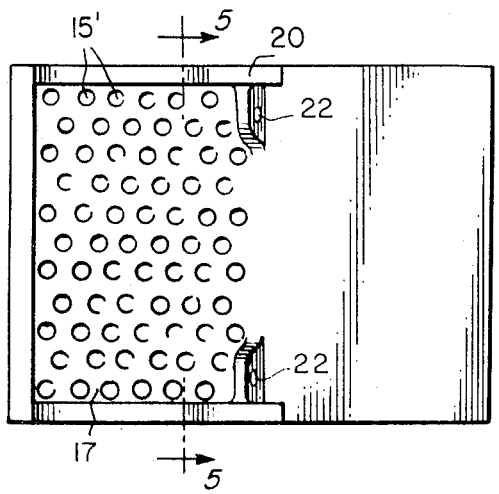
FIG. 4 is a partial bottom view taken along lines 4—4 of FIG. 3 showing the grate.

According to the present invention, and referring to FIG. 3, a grate 17 is mounted on a support frame 18 which has no arms 13, as in FIG. 2. Thus, as shown in dotted lines at 17', the grates, after dismounting from bolt 19, are freely removed through space E which is fully accessible between each support 18 and the next one 18'.

To insure for each line of fixed or movable grates and grate support assemblies, satisfactory mechanical strength in spite of the absence of arms 13 on the support frames, grates 17 are provided with flanges 20 which give the grates the robust characteristics of rigidly undeformable beams. This flange has a downwardly-protruding extension 21 which rests solidly on support frame 18 and acts to insure a solid assembly in conjunction with bolt connection 19. The extension 21 also limits the downward pivotal movement of the grates and prevents the leading edge of the grate from bearing too heavily on the adjacent grate that is overlaps.

In FIGS. 4, 5, 10 and 12, a better view of the arrangement of orifices 15' provided for passage of the current of cold air $f_4$ and the support frame are shown. The lateral accommodations 22 provided close to the side of grate 17 to abut against the head of bolts 19 make it possible to prevent obstruction of any portion of the surface covered by orifices 15', thus permitting the cooling air to freely strike the products moving on the grates.

Figure 7:
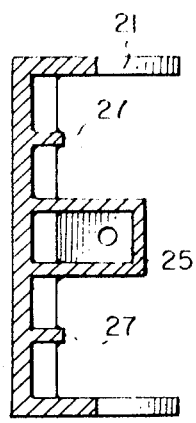
FIGS. 7 and 8 are sectional views taken along lines 7—7 and 8—8, respectively, of FIG. 6.
Figure 8:
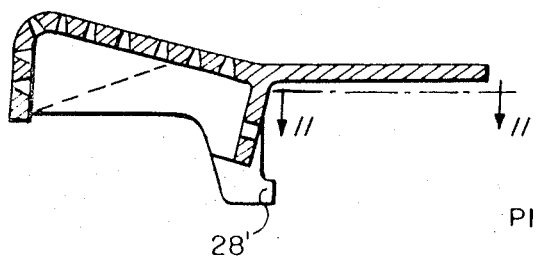
Figure 11:
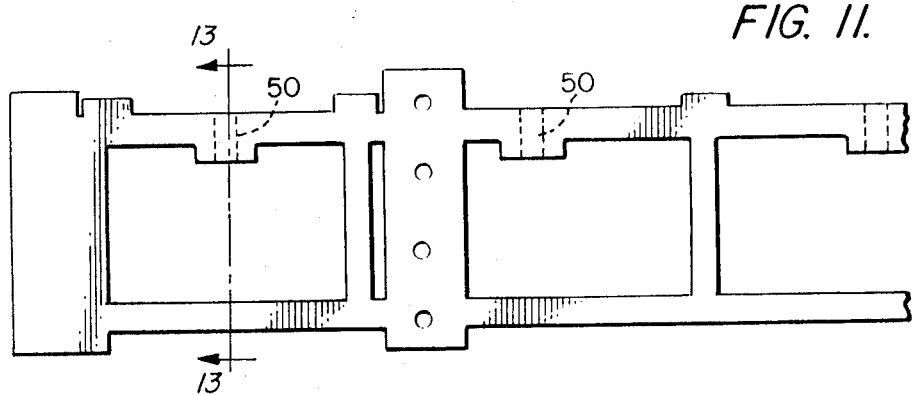

FIGS. 7 and 8 illustrate an alternate embodiment of grate 23 which can be used with certain existing apparatus. The grate 23 is attached to its support frame by a central rib 25. Grate 23 is provided with supplementary reinforcing ribs 27. In another embodiment shown in FIG. 15, an attaching rib 26 for grate 24 is provided, again axially but to the rear of the grate. The support frame for such grate is illustrated in FIGS. 11 and 13.

Figure 5:
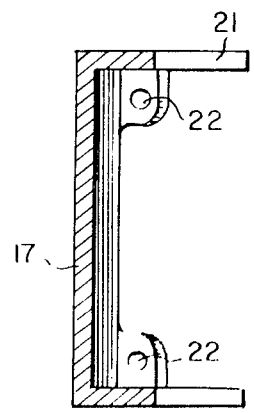
FIG. 5 is a sectional view taken along lines 5—5 of FIG. 4.

FIG. 16 shows how the from of embodiments of FIGS. 5, 14 and 15 of a grate 24 according to this invention is interlocked by means of a hook-like portion 28 provided at the end of flanges 21 and its corresponding supporting opening 29 in the support frame.

The lateral hook-like portion 28 enters the opening 29 provided close to the side of a wall 30 of support frame 18. Grate 24, according to the invention, is thus held tightly to it during the operation of the fixed and mobile support 18 by a bolt through the attaching rib 26 and by the interlocking hook ararngement of 28 and 29.

Figure 6:
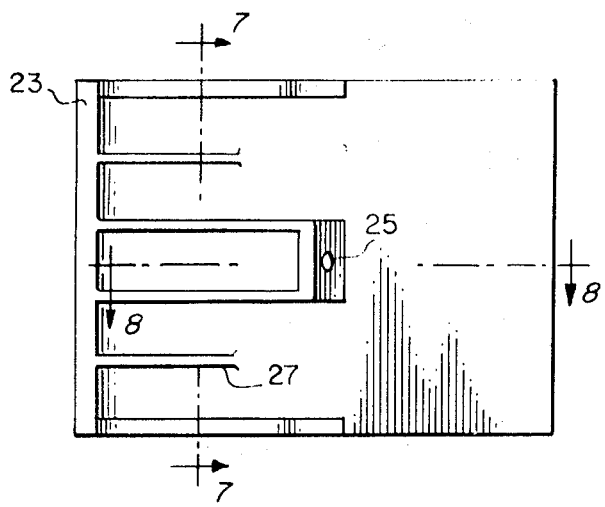

The grates 17 and 23 of FIGS. 3 and 6, respectively, also have a similar hook-like portion 28' which interlocks with the corresponding openings 40 and 50.

It will be understood that it is intended to cover all changes and modifications of the disclosure of the invention herein chosen for the purpose of illustration which do not constitute departures from the spirit and scope of the invention.

What is claimed is:

1. In a heat exchanger apparatus having a series of fixed and movable grates mounted on support frames, said grates arranged in a substantially horizontal and overlapping fashion and so positioned that the movable grates reciprocate substantially longitudinally with respect to the fixed grates, the improvement comprising a grate and support frame assembly wherein the grate is in contact with the support frame solely at points rearwardly of about substantially the midportion of the grate and the grate has at least one reinforcing flange depending therefrom, said flange having a downwardly-protruding extension with engaging means adapted to engage the support frame.

2. The apparatus of claim 1 wherein the grate has a reinforcing flange depending from each side thereof.

3. The apparatus of claim 1 wherein the engaging means is a hook-like portion formed integrally with the flange.

4. The apparatus of claim 1 including means for fastening the grate to the support frame.

5. The apparatus of claim 1 wherein the grate has a reinforcing flange depending from each side thereof with a hook-like portion on each flange formed integrally therewith and the grate includes means for fastening the grate to the support frame.

6. The apparatus of claim 5 wherein the support frame is provided with means for interlocking engagement with the hook-like portions on each flange.

References Cited

UNITED STATES PATENTS

| 3,170,775 | 2/1965 | Howell, Jr. | 263—32 |
| 3,321,845 | 5/1967 | Boron | 34—164 |

JOHN J. CAMBY, Primary Examiner

U.S. Cl. X.R.

263—32